(12) United States Patent
Aizawa

(10) Patent No.: US 7,890,332 B2
(45) Date of Patent: Feb. 15, 2011

(54) INFORMATION PROCESSING APPARATUS AND USER INTERFACE CONTROL METHOD

(75) Inventor: Michio Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 996 days.

(21) Appl. No.: 11/483,653

(22) Filed: Jul. 11, 2006

(65) Prior Publication Data

US 2007/0016423 A1 Jan. 18, 2007

(30) Foreign Application Priority Data

Jul. 14, 2005 (JP) ............................. 2005-206130

(51) Int. Cl.
*G10L 21/00* (2006.01)
*G10L 13/00* (2006.01)
*G03G 15/00* (2006.01)

(52) U.S. Cl. ..................... 704/270; 704/258; 399/81

(58) Field of Classification Search ................ None
See application file for complete search history.

(56) References Cited

U.S. PATENT DOCUMENTS

| 4,375,329 | A | * | 3/1983 | Park ............................ 399/81 |
| 5,239,617 | A | * | 8/1993 | Gardner et al. ............... 706/11 |
| 5,546,166 | A | * | 8/1996 | Hirota et al. .................. 399/43 |
| 6,243,682 | B1 | * | 6/2001 | Eghtesadi et al. ........... 704/270 |
| 6,621,992 | B2 | * | 9/2003 | Kishi et al. .................... 399/81 |
| 6,842,593 | B2 | * | 1/2005 | Cannon ........................ 399/81 |
| 7,110,692 | B2 | * | 9/2006 | Kotani ......................... 399/81 |
| 7,171,364 | B2 | * | 1/2007 | Kouzu ........................ 704/271 |
| 2004/0098261 | A1 | | 5/2004 | Kaneko et al. |

FOREIGN PATENT DOCUMENTS

| JP | 9-114480 | 5/1997 |
| JP | 2003-108182 | 4/2003 |

* cited by examiner

*Primary Examiner*—Brian L Albertalli
(74) *Attorney, Agent, or Firm*—Fitzpatrick, Cella, Harper & Scinto

(57) ABSTRACT

An information processing apparatus can set one of a plurality of setting values for a setting item. A guidance holding unit holds guidance information for voice output for each of the plurality of setting values. A document information acquisition unit acquires document information as limiting information which limits a range of a settable setting value. A guidance selection unit and a guidance change unit acquire pieces of guidance information to be output by voice on the basis of the pieces of guidance information corresponding to the plurality of setting values held in the guidance holding unit and the limiting information acquired by the document information acquisition unit. A voice information output unit outputs, by voice, the acquired pieces of guidance information to be output by voice.

6 Claims, 17 Drawing Sheets

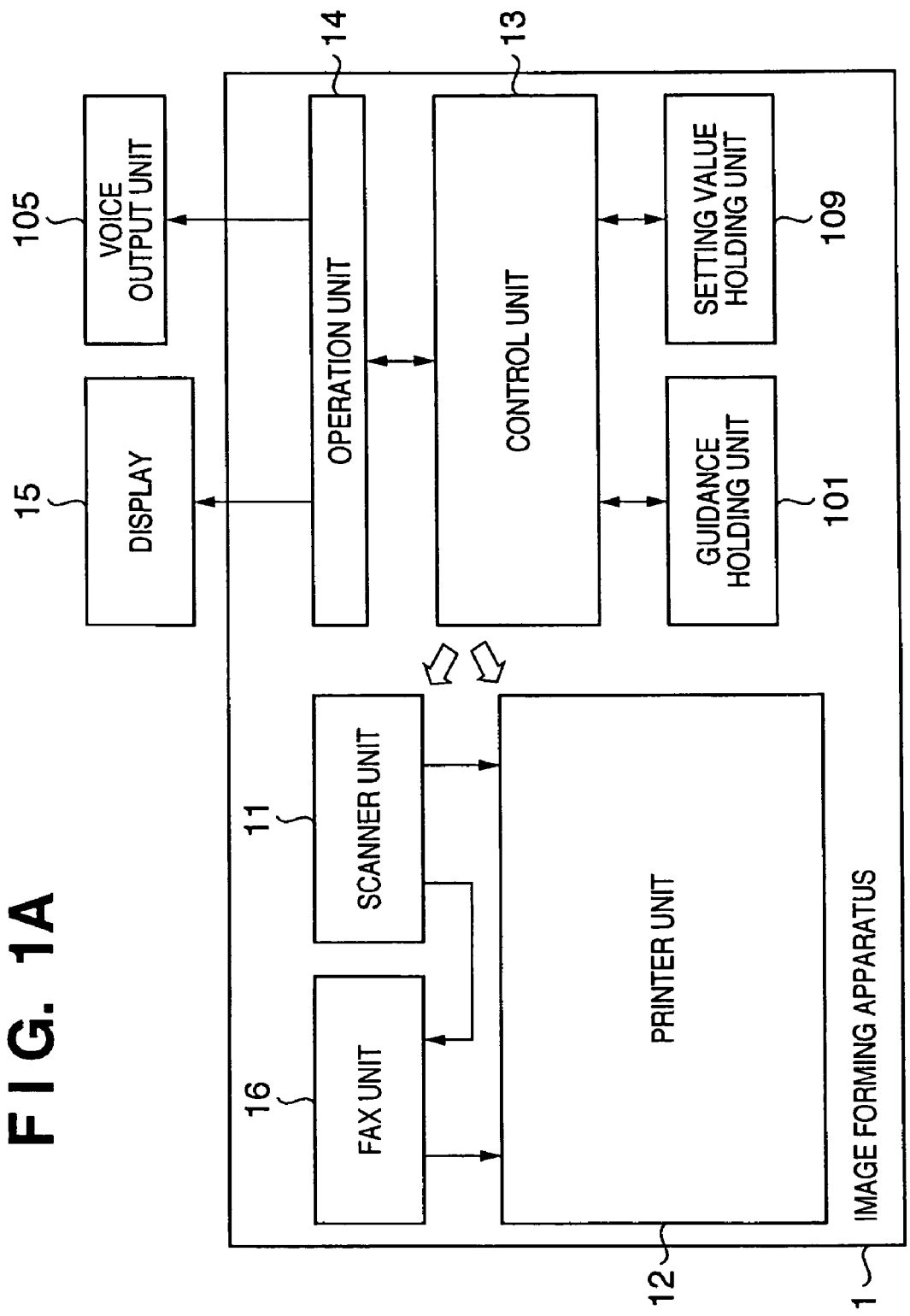

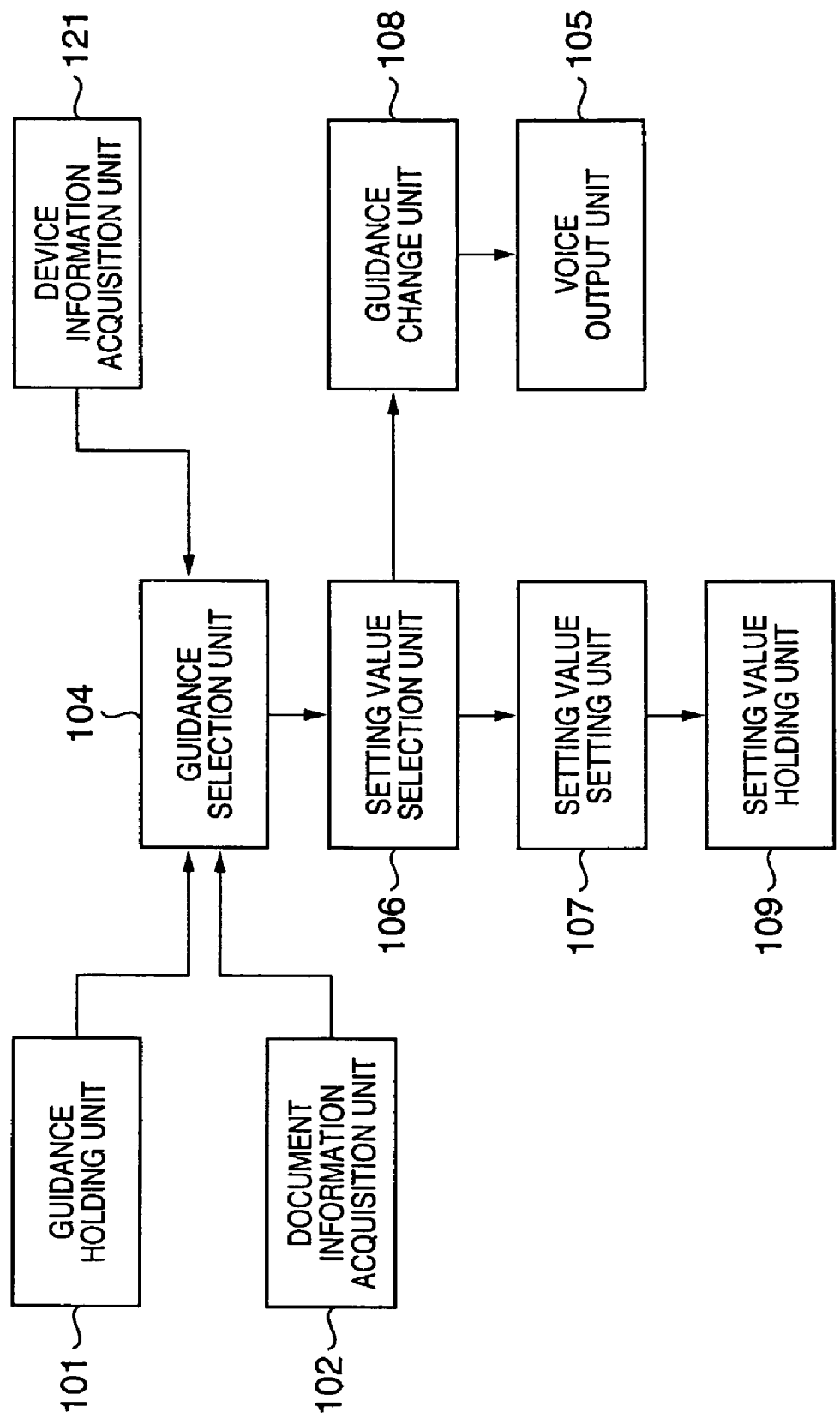

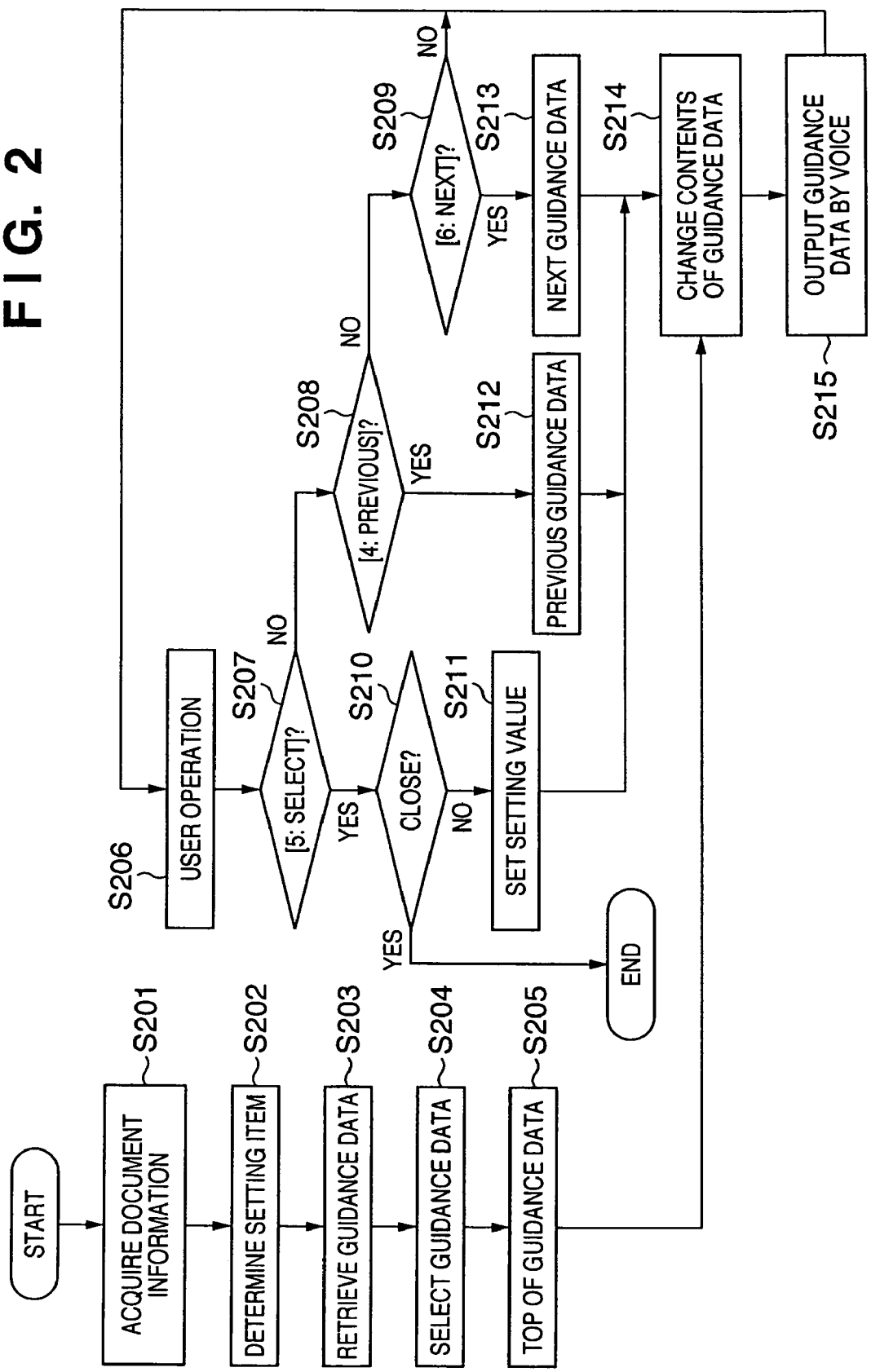

FIG. 10

| SETTING VALUE | DOCUMENT INFORMATION/DEVICE INFORMATION | GUIDANCE DATA |
|---|---|---|
| 86% | DEFAULT | A3 TO B4, A4 OR LETTER TO B5 |
| | PAPER SIZE: A4 | A4 TO B5 |
| | PAPER SIZE: A3 | A3 TO B4 |
| | LETTER | LETTER TO B5 |

FIG. 11

| SETTING VALUE | DOCUMENT INFORMATION: PAPER SIZE | GUIDANCE DATA |
|---|---|---|
| 50% | A3 | 50%, A3 TO A5 |
| 61% | A3 | 61%, A3 TO B5 |
| 70% | A3, B4 | 70%, A3 TO A4 OR LETTER, B4 TO B5 |
| 81% | B4, B5 | 81%, B4 TO A4 OR LETTER, B5 TO A5 |
| 86% | A3, A4, LETTER | 86%, A3 TO B4, A4 OR LETTER TO B5 |
| FULL SIZE | ALL | FULL SIZE |
| 115% | B4, B5 | 115%, B4 TO A3, B5 TO A4 OR LETTER |
| 122% | A4, LETTER, A5 | 122%, A4 OR LETTER TO B4, A5 TO B5 |
| 141% | A4, LETTER, B5 | 141%, A4 OR LETTER TO A3, B5 TO B4 |
| 200% | A5 | 200%, A5 TO A3 |
| CLOSE | ALL | CLOSE |

FIG. 15

| SETTING ITEM: DOUBLE-SIDED | | |
|---|---|---|
| SETTING VALUE | DOCUMENT INFORMATION | GUIDANCE DATA |
| SINGLE-SIDED→DOUBLE-SIDED | SINGLE-SIDED | SINGLE-SIDED TO DOUBLE-SIDED |
| DOUBLE-SIDED→SINGLE-SIDED | DOUBLE-SIDED | DOUBLE-SIDED TO SINGLE-SIDED |
| DOUBLE-SIDED→DOUBLE-SIDED | DOUBLE-SIDED | DOUBLE-SIDED TO DOUBLE-SIDED |
| BOOK TO DOUBLE-SIDED | SINGLE-SIDED | BOOK TO DOUBLE-SIDED |
| CLOSE | ALL | CLOSE |

INFORMATION PROCESSING APPARATUS AND USER INTERFACE CONTROL METHOD

BACKGROUND OF THE INVENTION

1. Field of the Invention

The present invention relates to an information processing apparatus with an voice output function and, more particularly, to a user interface using voice output.

2. Description of the Related Art

In a user interface using voice output (voice UI), a message or guidance information is output by voice to notify a user of the current settings of a device or to prompt a user for the next action. However, if the voice output in such an voice UI requires long time, a user will be required to listen to the voice output for an increased period of time, and this may impair usability.

As a technique for limiting voice message output, Japanese Patent Laid-Open No. 9-114480 (to be referred to as Patent Document 1 hereinafter) discloses a configuration which limits utterance of voice messages such as warnings depending on the frequency of occurrence of those error conditions. Japanese Patent Laid-Open No. 2003-108182 (to be referred to as Patent Document 2 hereinafter) discloses a configuration in an apparatus such as a facsimile which outputs, by voice, the setting values from a plurality of setting parameters, only those values which have become different from their corresponding predetermined reference values.

Both Patent Document 1 and Patent Document 2 are methods for shortening the time during which voice output is performed. However, in Patent Document 1, only the enabling and disabling of warning message output is controlled. Even if this control is applied to the voice guidance of a user interface, whether to provide a voice guidance is controlled only with respect to a certain setting item or setting value. Also, in Patent Document 2, only setting values which have changed are read aloud, and voice guidance on a setting item or setting value to be set are not handled.

In other words, as for a voice guidance for explaining a certain setting item or setting value, neither Patent Document 1 nor Patent Document 2 demonstrates a mechanism which achieves a reduction in the output time for a voice guidance while simultaneously enhancing voice guidance functions to a satisfactory level.

SUMMARY OF THE INVENTION

The present invention has been made in consideration of the above-described problem, and has as its object to streamline the output contents of a voice guidance on setting of a device, shorten voice output time, and provide a user interface with good operability.

According to one aspect of the present invention, there is provided an information processing apparatus which can set one of a plurality of setting values for a setting item, comprising: a guidance holding unit adapted to hold guidance information for voice output for each of the plurality of setting values; a first acquisition unit adapted to acquire information which can limit a range of a settable setting value; a second acquisition unit adapted to acquire guidance information to be output by voice on the basis of the guidance information corresponding to the plurality of setting values, held in the guidance holding unit, and the information acquired by the first acquisition unit; and an output unit adapted to output, by voice, the guidance information acquired by the second acquisition unit.

Furthermore, according to another aspect of the present invention, three is provided a control method for a user interface which can set one of a plurality of setting values for a setting item, comprising: a first acquisition step of acquiring information which can limit a range of a settable setting value; a second acquisition step of acquiring guidance information to be output by voice on the basis of guidance information corresponding to the plurality of setting values, held in a guidance holding unit for holding guidance information for voice output for each of the plurality of setting values, and the information acquired in the first acquisition step; and an output step of outputting, by voice, the guidance information acquired in the second acquisition step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a block diagram for explaining the configuration of an information processing apparatus according to a first embodiment;

FIG. 1B is a block diagram showing a functional configuration which implements a user interface with a voice guidance function of the first embodiment;

FIG. 2 is a flowchart for explaining the processing procedure according to the first embodiment;

FIG. 10 is a chart showing an example of data in a guidance holding unit 101 according to a fourth embodiment;

FIG. 11 is a chart showing an example of data in the guidance holding unit 101 according to the fourth embodiment;

FIG. 15 is a chart showing an example of data in a guidance holding unit according to another embodiment.

DESCRIPTION OF THE EMBODIMENTS

Figure 3:
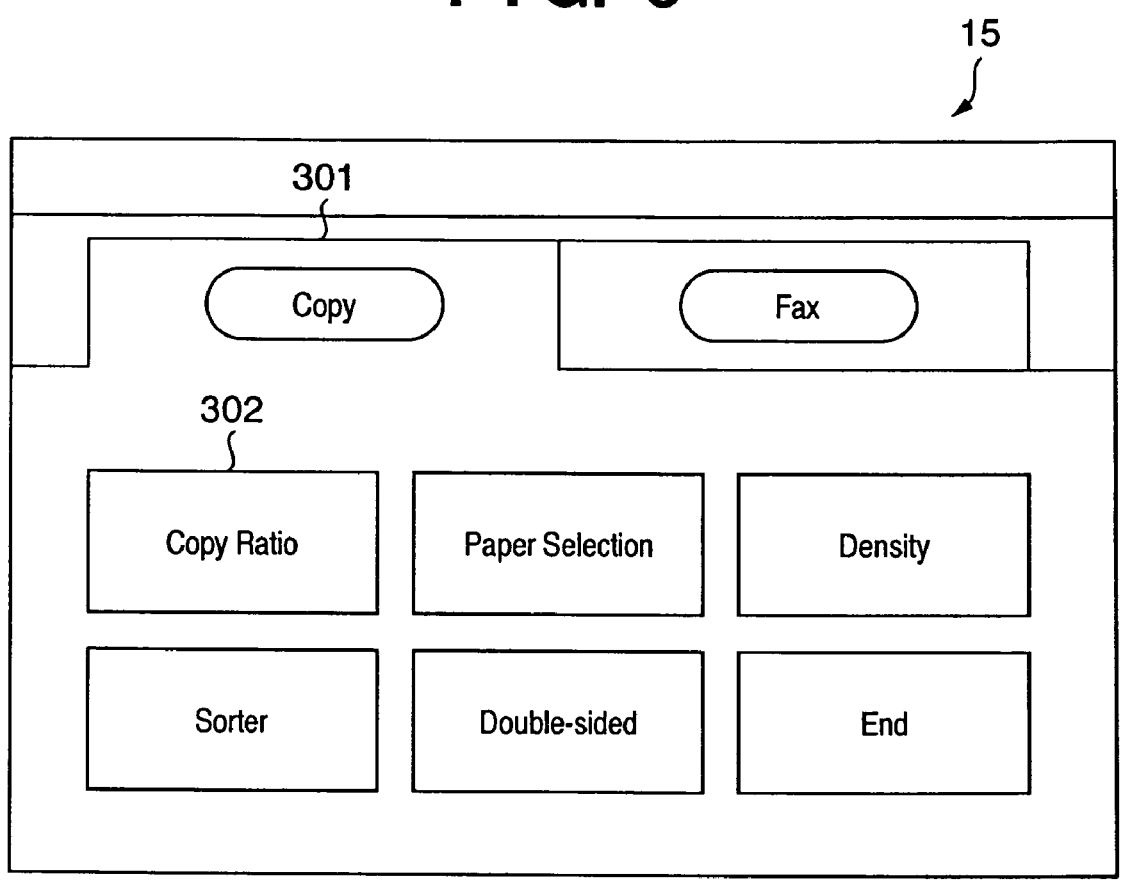
FIG. 3 is a view showing an example of a GUI for selecting a setting item in the first embodiment.

Preferred embodiments of the present invention will now be described in detail in accordance with the accompanying drawings.

First Embodiment

FIG. 1A is a block diagram for explaining the configuration of an information processing apparatus according to a first embodiment. This embodiment will explain a case where an information processing apparatus to be used is an image forming apparatus such as a copying machine or FAX.

In an image forming apparatus 1, a scanner unit 11 optically reads a document image and generates an image signal. A printer unit 12 prints an image signal acquired by the scanner unit 11. The scanner unit 11 and printer unit 12 implement a copy function. The configurations of the scanner unit 11 and printer unit 12 are not particularly limited, and a known configuration can be used for each of them. The image forming apparatus 1 also has a fax unit 16 and implements a facsimile function. The fax unit 16 facsimiles a document image read by the scanner unit 11 to a destination set through an operation unit 14. The fax unit 16 decodes facsimile data received from an external facsimile apparatus and causes the printer unit 12 to form an image.

A control unit 13 comprises a CPU and memory (not shown) and controls the entire image forming apparatus 1. The operation unit 14 provides a user interface which allows a user to make various settings for the image forming apparatus 1. Note that the operation unit 14 includes a display 15 and comprises a touch panel function. A voice output unit 105 includes a speaker and is used to notify a user of guidance information (to be simply referred to as guidance hereinafter) for various settings by voice synthesis. A plurality of guidances corresponding to various setting items are held in a guidance holding unit 101. The control unit 13 selects a guidance in response to an operation input from the operation unit 14 and causes the voice output unit 105 to output the guidance by voice. A setting value holding unit 109 holds a setting value determined by each of various setting operations from the operation unit 14 in association with a corresponding one of the setting items. The control unit 13 refers to the setting values held in the setting value holding unit 109 and controls the scanner unit 11 and printer unit 12.

FIG. 1B is a block diagram showing a functional configuration which implements a user interface with a voice guidance function of this embodiment. Assume that various functions shown in FIG. 1B are implemented by the control unit 13 of the image forming apparatus 1. Note that these functions are implemented by cooperation between software and hardware, as will be seen from an explanation to be given below.

The guidance holding unit 101 is composed of a hard disk or a storage medium such as a ROM and holds a guidance corresponding to each of a plurality of setting values for each of setting items. A document information acquisition unit 102 acquires document information to be processed. Document information is acquired, e.g., by detecting the size of a document placed on the scanner unit 11 or from an operation input from the operation unit 14. A guidance selection unit 104 selects one of a plurality of guidances held in the guidance holding unit 101 on the basis of a designated setting item or document information. A setting value selection unit 106 selects one of setting values corresponding to the selected guidance. The guidance corresponding to the selected setting value enters an active status. A guidance change unit 108 streamlines the contents of the guidance in the active status on the basis of document information acquired by the document information acquisition unit 102 and causes the voice output unit 105 to output the guidance by voice. A setting value setting unit 107 sets a setting value selected by the setting value selection unit 106 and determined by a user operation for a designated setting item and causes the setting value holding unit 109 to hold the setting value. A setting value determined for each of the setting items is held in the setting value holding unit 109. Note that a device information acquisition unit 121 is a component which will be used in a second embodiment and may be omitted in the first embodiment. The device information acquisition unit 121 will be explained in the second embodiment.

The operation of the above-described functional blocks will become more apparent from an explanation to be given below with reference to a flowchart in FIG. 2.

FIG. 2 is a flowchart for explaining the procedure for processing by the information processing apparatus of the first embodiment.

In step S201, the document information acquisition unit 102 acquires document information which serves as an object to be processed. For example, the document information acquisition unit 102 may acquire document information such as a paper size by reading a document placed on a document table of the scanner unit 11 or a user may directly input document information using an voice UI or GUI provided by the operation unit 14. Document information acquired by the document information acquisition unit 102 includes, e.g., a paper size, monochrome or color, and single-sided or double-sided.

In step S202, the guidance selection unit 104 determines a setting item for which a setting value is to be set in accordance with a selection instruction from a user through the operation unit 14. The guidance selection unit 104 presents a graphical user interface (GUI) as in, e.g., FIG. 3 on the display 15 to let a user designate a desired setting item. The display 15 is composed of, e.g., a touch panel, and a user can select a desired setting item by touching a rectangle corresponding to the setting item. Of course, a voice UI may be used to determine a setting item by subjecting a user's voice to voice recognition. The following processing will be explained on the assumption that in FIG. 3, a tab 301 (copy function) is designated and that a setting item button 302 (copy ratio) is designated.

Figure 4:
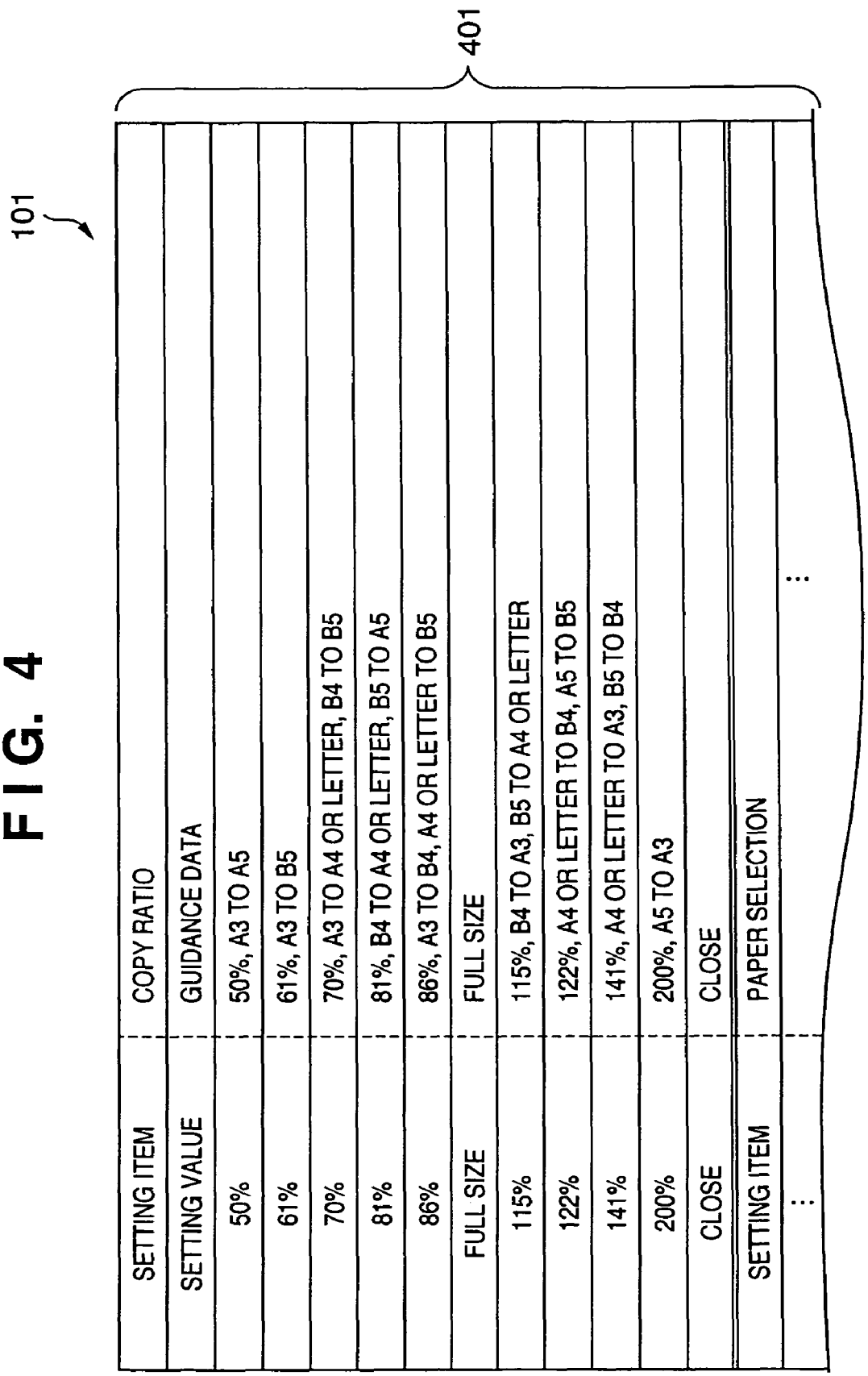
FIG. 4 is a chart showing an example of data on copy ratio setting in a guidance holding unit 101.
Figure 5:
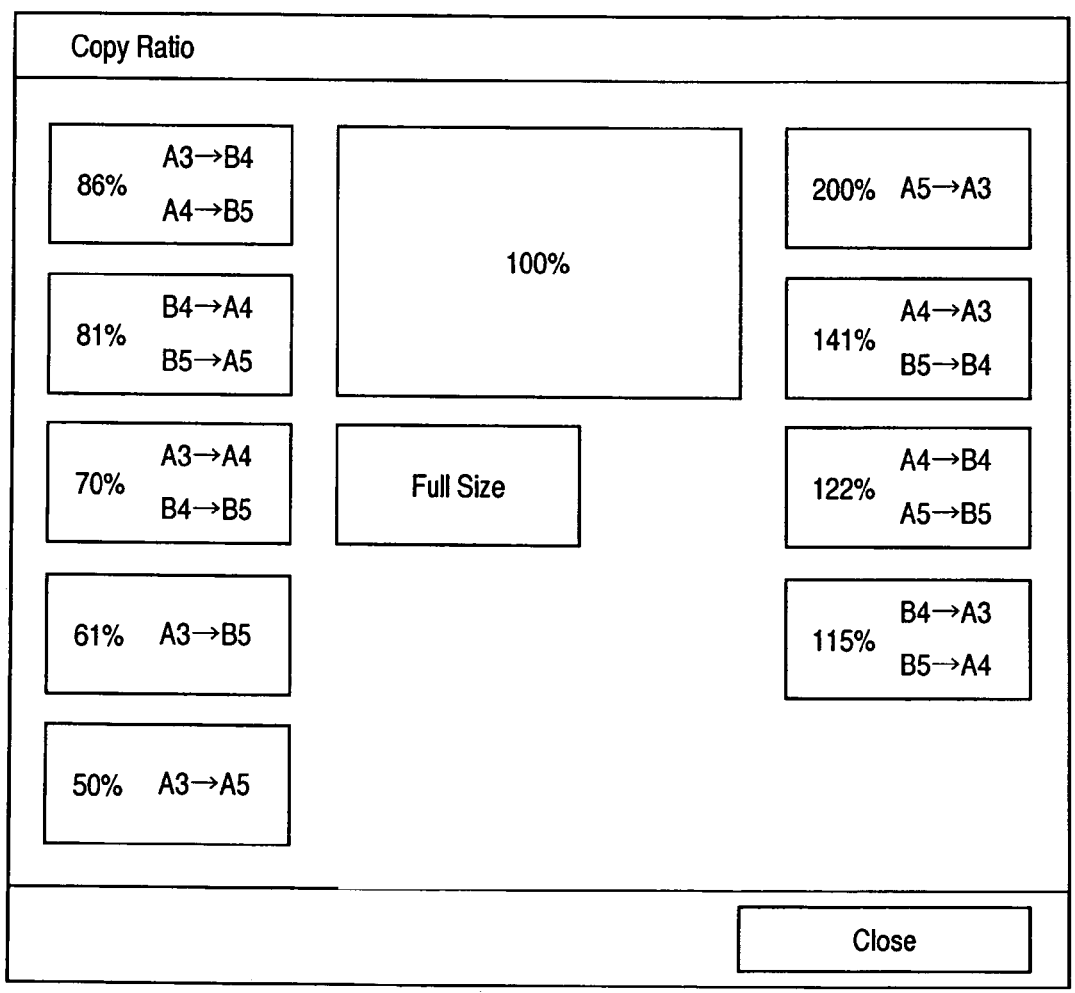
FIG. 5 is a view showing an example of a GUI associated with copy ratio setting.

In step S203, the guidance selection unit 104 retrieves a guidance corresponding to the setting item determined in step S202 from the guidance holding unit 101. As shown in, e.g., FIG. 4, a pair of a setting value and a guidance is held in the guidance holding unit 101 for each of setting items. FIG. 4 shows a part of a guidance registration portion 401 corresponding to a setting item of "copy ratio." Note that a setting value of "close" is not one set for the setting item of "copy ratio" but is a control command used to end processing associated with the setting item of "copy ratio." The guidance in FIG. 4 correspond to a GUI screen for copy ratio setting shown in, e.g., FIG. 5. Such a GUI screen is displayed on the display 15.

In step S204, the guidance selection unit 104 selects ones to be output by voice from the guidances retrieved in step S203 (ones corresponding to the selected setting item) on the basis of the document information acquired by the document information acquisition unit 102 in step S201. As an example, a case will be explained below where document information of "paper size: A4" is acquired in step S201.

Of the guidances shown in FIG. 4, for example, "50%, A3 to A5" indicates "a copy ratio for outputting data of an A3 document on an A5 paper sheet." This guidance is incompatible with the document information of "paper size: A4" and thus not selected. In other words, since the document to be processed is A4 sized, "50%, A3 to A5" is an unnecessary guidance and excluded from objects to be selected. For example, guidance of "86%, A3 to B4; or A4 or letter to B5"

indicates (1) "a copy ratio for outputting data of a document with a paper size of A3 on a B4 paper sheet (A3 to B4)," (2) "a copy ratio for outputting data of a document with a paper size of A4 on a B5 paper sheet (A4 to B5)," or (3) "a copy ratio for outputting data of a document with a paper size of letter on a B5 paper sheet (letter to B5)." Since (2) is compatible with the document information of "paper size: A4," that guidance (86%, A3 to B4; or A4 or letter to B5) is selected. Note that the guidance of "full size" available to all sizes and the guidance of "close" corresponding to a control command are always selected.

As seen from the above description, if the current setting item is "copy ratio," and the document information is "paper size: A4," five guidances, "86%, A3 to B4; or A4 or letter to B5," "full size," "122%, A4 or letter to B4; or A5 to B5," "141%, A4 or letter to A3; or B5 to B4," and "close" are selected.

In step S205, the setting value selection unit 106 activates the top one of the guidances selected in step S204. In this example, the setting value selection unit 106 activates the guidance of "86%, A3 to B4; or A4 or letter to B5."

In step S214, the guidance change unit 108 changes the contents of the guidance in the active status on the basis of the document information acquired in step S201. As an example of a change method, a part (portion corresponding to the document information) of the guidance in the active status is extracted to generate a guidance after change. For example, if the guidance in the active status is "86%, A3 to B4; or A4 or letter to B5," the guidance change unit 108 performs the same analysis as in step S204 on the guidance in the active status. The guidance change unit 108 extracts "86%, A4 to B5" corresponding to the document information of "paper size: A4" and sets the part as a guidance after change. In step S215, the voice output unit 105 outputs, by voice, the guidance after change acquired in step S214 using, e.g., voice synthesis. Note that if change of the guidance is unnecessary, the process in step S214 (performed by the guidance change unit 108) is skipped. For example, if the paper size is A5, and guidance of "200%, A5 to A3" is in the active status, the guidance need not be changed and is output by voice without change.

Figure 14:
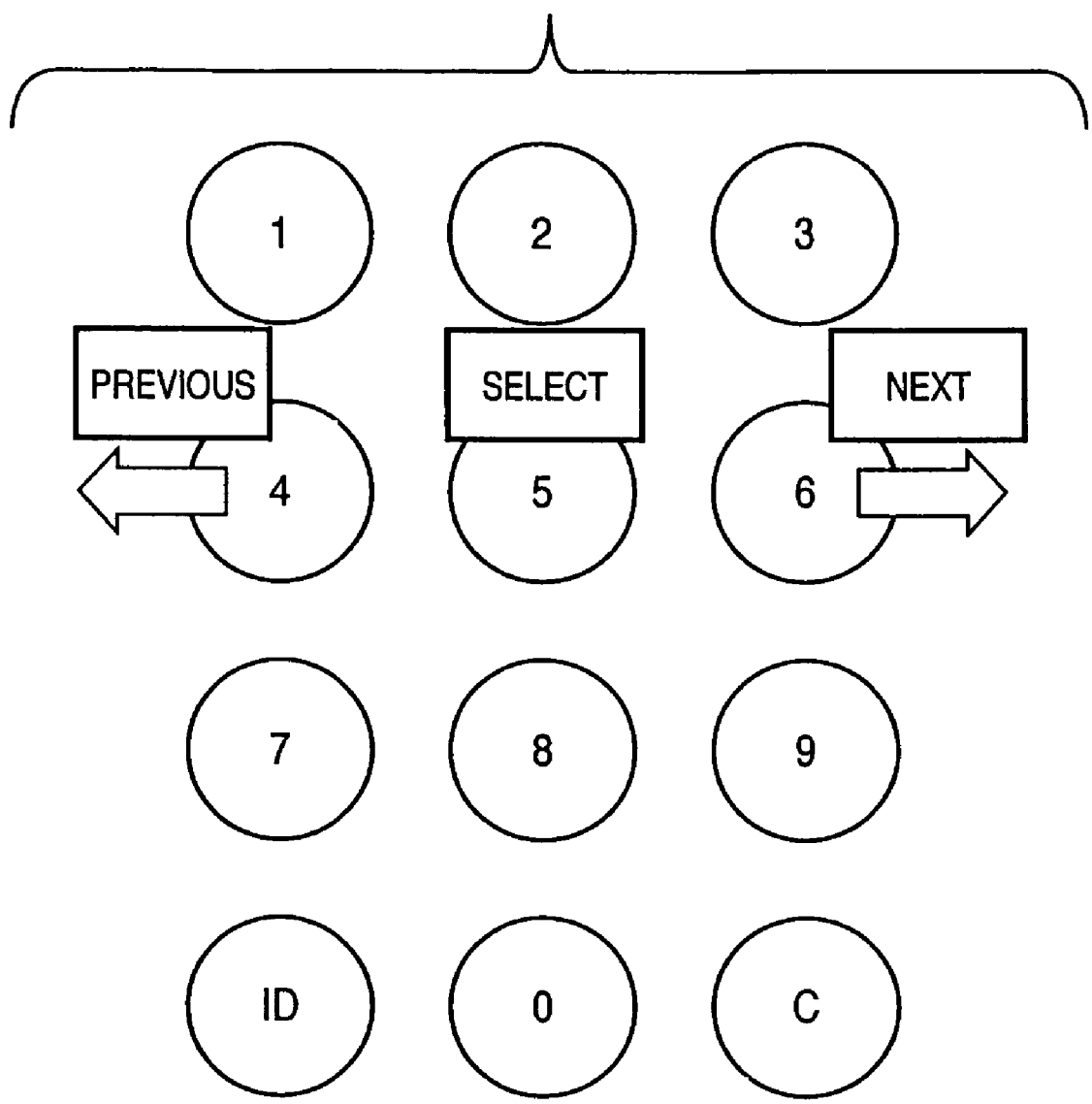
FIG. 14 is a view for explaining an operation with a numeric keypad.

In step S206, the details of an operation for selecting a setting value performed by a user through the operation unit 14 are input. This embodiment will explain a case where a setting value is selected using a numeric keypad of the operation unit 14 as shown in FIG. 14. For example, a user switches an active guidance using "4" and "6" keys of the numeric keypad and checks each guidance output by voice. When the user recognizes the guidance as one corresponding to a desired setting value, he/she presses a "5" key. With this operation, the setting value is determined as a setting.

If the "5" key of the numeric keypad is pressed, the setting value selection unit 106 advances the processing from step S207 to step S210. In step S210, it is determined whether the guidance in the active status at this time corresponds to the control command "close." If the guidance corresponds to "close," the processing ends; otherwise, the processing advances to step S211. In step S211, the setting value setting unit 107 sets a setting value corresponding to the guidance in the active status at the time for the setting item in question and stores the setting value in the setting value holding unit 109. For example, if the guidance of "122%, A4 or letter to B4; or A5 to B5" is in the active status, the setting value setting unit 107 sets a setting value of "122%" for the setting item of "copy ratio."

If the "4" key of the numeric keypad is pressed, the processing advances to step S212 through steps S207 and S208.

Figure 12:
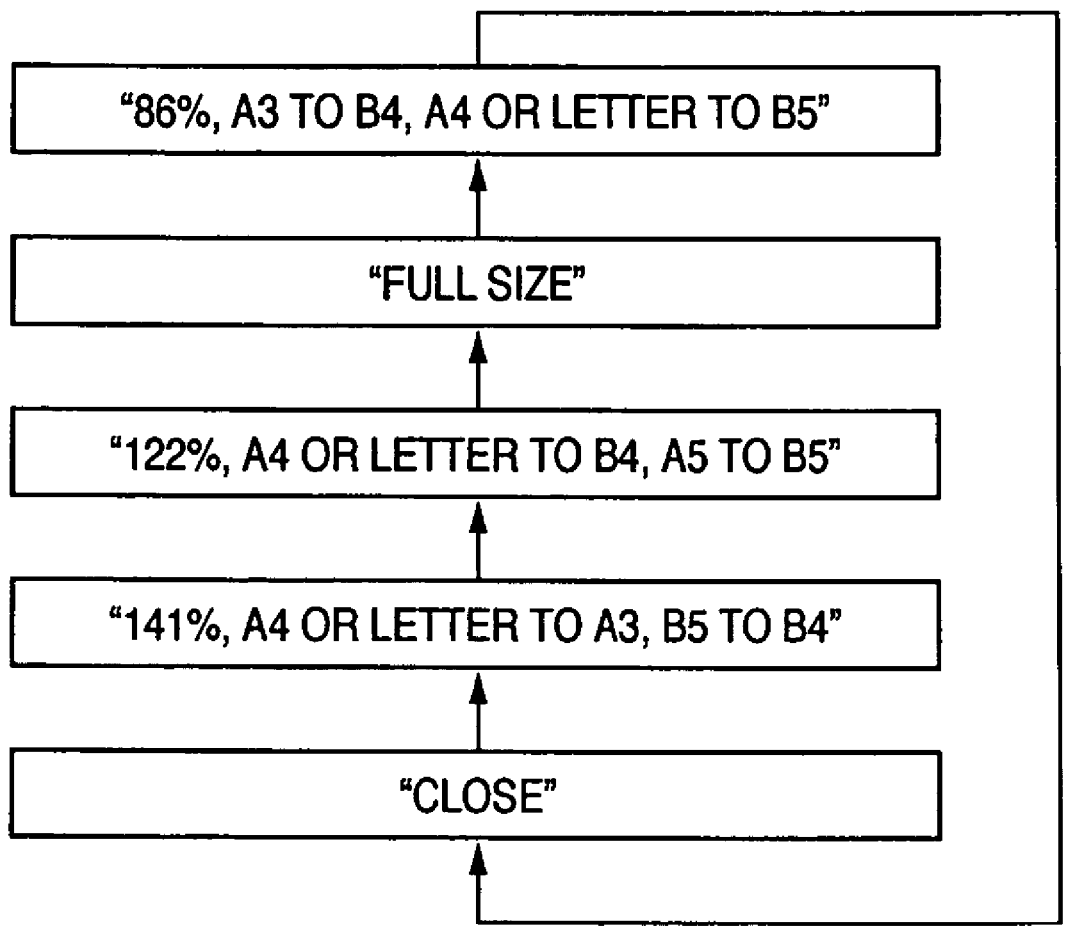
FIG. 12 is a diagram for explaining a transition of a guidance in the first embodiment.

In step S212, the setting value selection unit 106 activates one of the guidances selected in step S204 which immediately precedes the guidance currently in the active status. FIG. 12 is a diagram showing the transition of an active guidance when the "4" key of the numeric keypad is input. For example, if the "4" key of the numeric keypad is pressed when the guidance of "full size" is in the active status, the setting value selection unit 106 activates the guidance of "86%, A3 to B4; or A4 or letter to B5" in step S212. The guidance of "full size" having been in the active status is deactivated.

Figure 13:
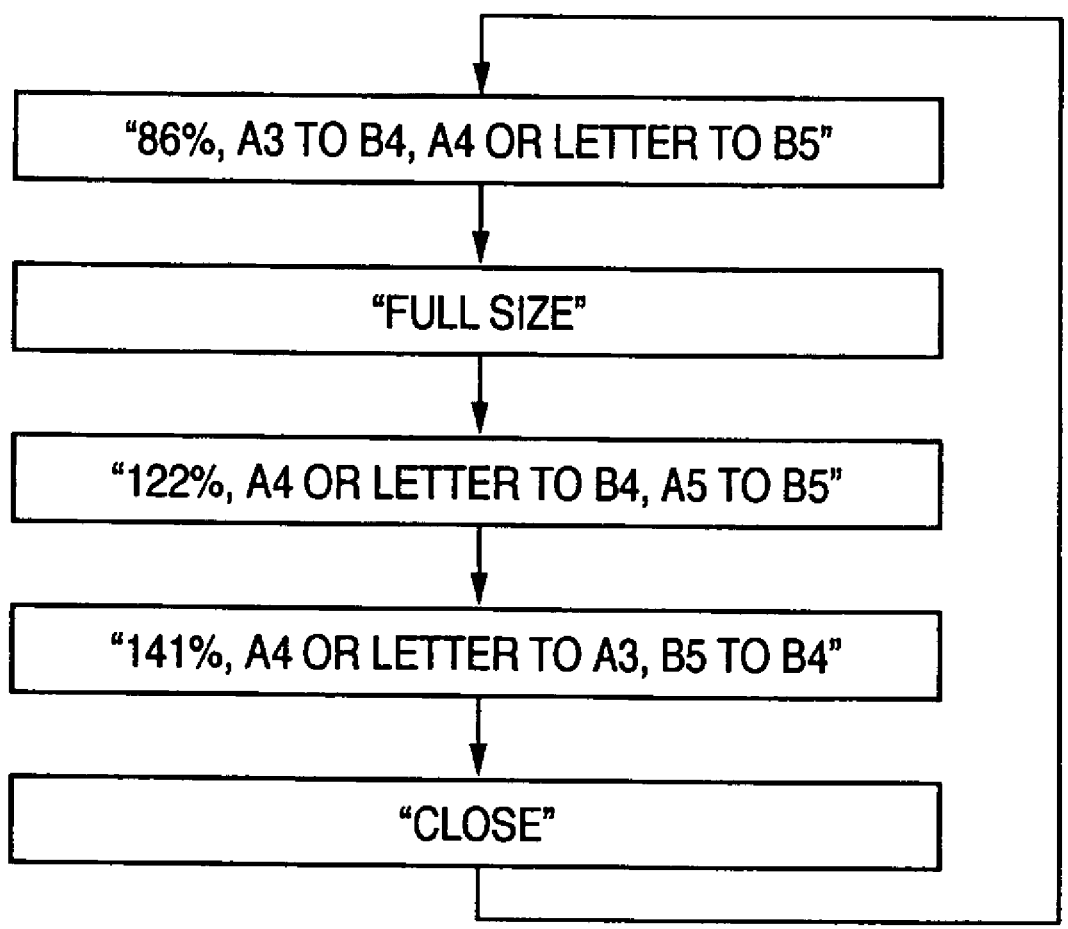
FIG. 13 is a diagram for explaining a transition of the guidance in the first embodiment.

If the "6" key of the numeric keypad is pressed, the processing advances to step S213 through steps S207, S208, and S209. In step S213, the setting value selection unit 106 activates one of the guidances selected in step S204 which immediately succeeds the guidance in the active status. FIG. 13 is a diagram showing the transition of an active guidance when the "6" key of the numeric keypad is input. For example, if the guidance of "full size" is in the active status, the setting value selection unit 106 activates the guidance of "122%, A4 or letter to B4; or A5 to B5." At this time, the guidance of "full size" having been in the active status is deactivated.

If none of the keys "4," "5," and "6" has been pressed, the processing returns to step S206.

When any of the processes in steps S211, S212, and S213 ends, the processes in steps S214 and S215 are performed. The guidance determined or activated is output by voice.

As described above, according to the first embodiment, "the number of guidances output by voice is reduced" in step S204, and "guidance output by voice is shortened" in step S214. This produces the effect of shortening the time to output these guidances by voice.

Second Embodiment

In the first embodiment, selection of a guidance and change of the contents of a guidance are performed on the basis of document information. However, the present invention is not limited to this. A second embodiment will explain a configuration which selects a guidance or changes the contents of a guidance on the basis of device information.

Figure 6:
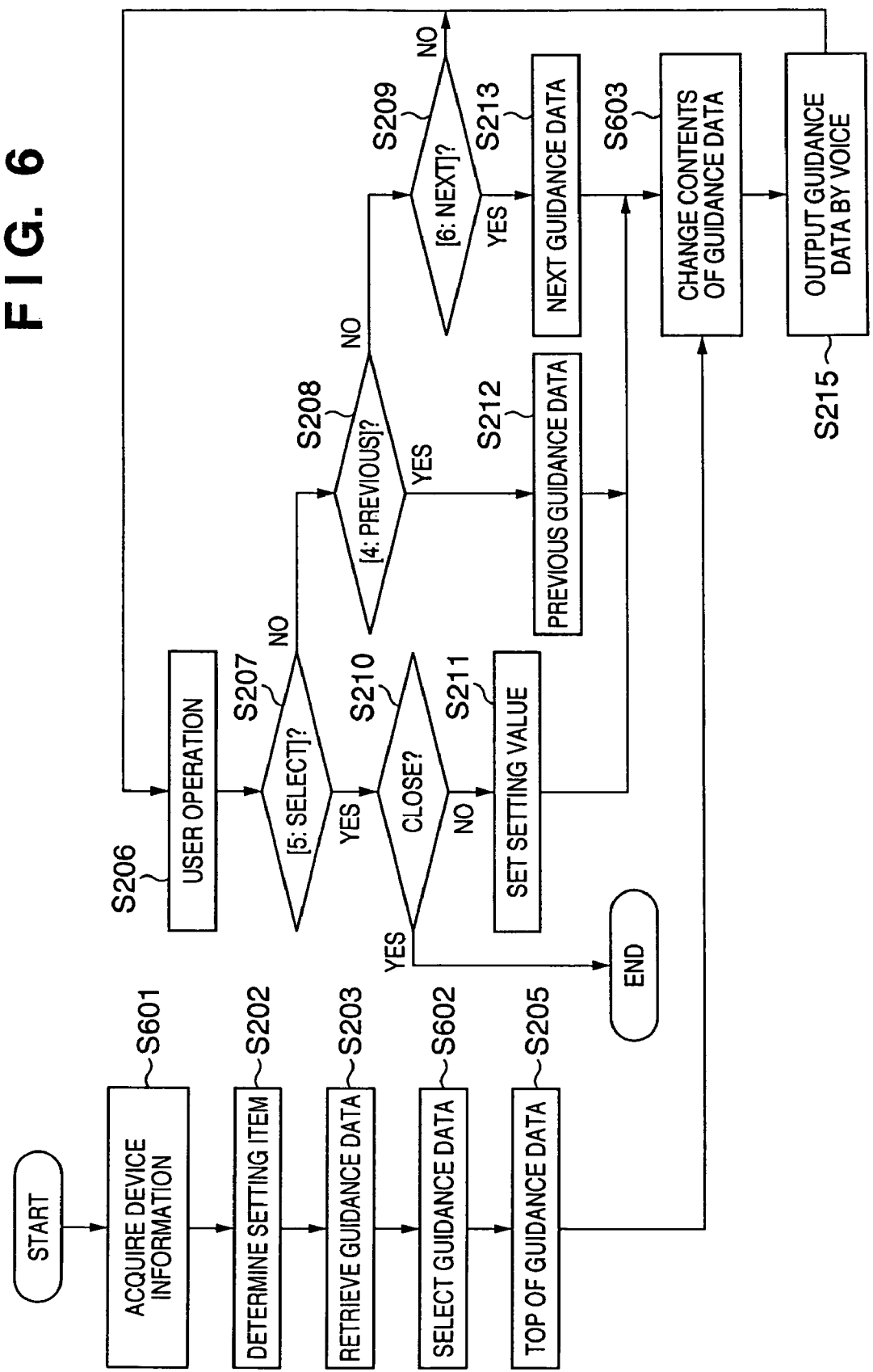
FIG. 6 is a flowchart for explaining the processing procedure according to a second embodiment.

The configuration of an image forming apparatus of the second embodiment is the same as that of the first embodiment (FIGS. 1A and 1B). Note that in FIG. 1B, a device information acquisition unit 121 is used and that a document information acquisition unit 102 can be omitted. FIG. 6 is a flowchart for explaining the procedure for processing by the image forming apparatus of the second embodiment. In FIG. 6, the processes in steps S202, S203, S205 to S213, and S215 are the same as those of the first embodiment (FIG. 2).

In step S601, the device information of an information processing apparatus is acquired. For example, the device information is acquired from values obtained by sensors provided at portions of an image forming apparatus 1. The device information acquired include the presence or absence of paper, the amount of toner remaining, and the number of staples remaining. A case will be explained below where "paper selection" is determined as the current setting item through a user interface in FIG. 3.

Figure 7:
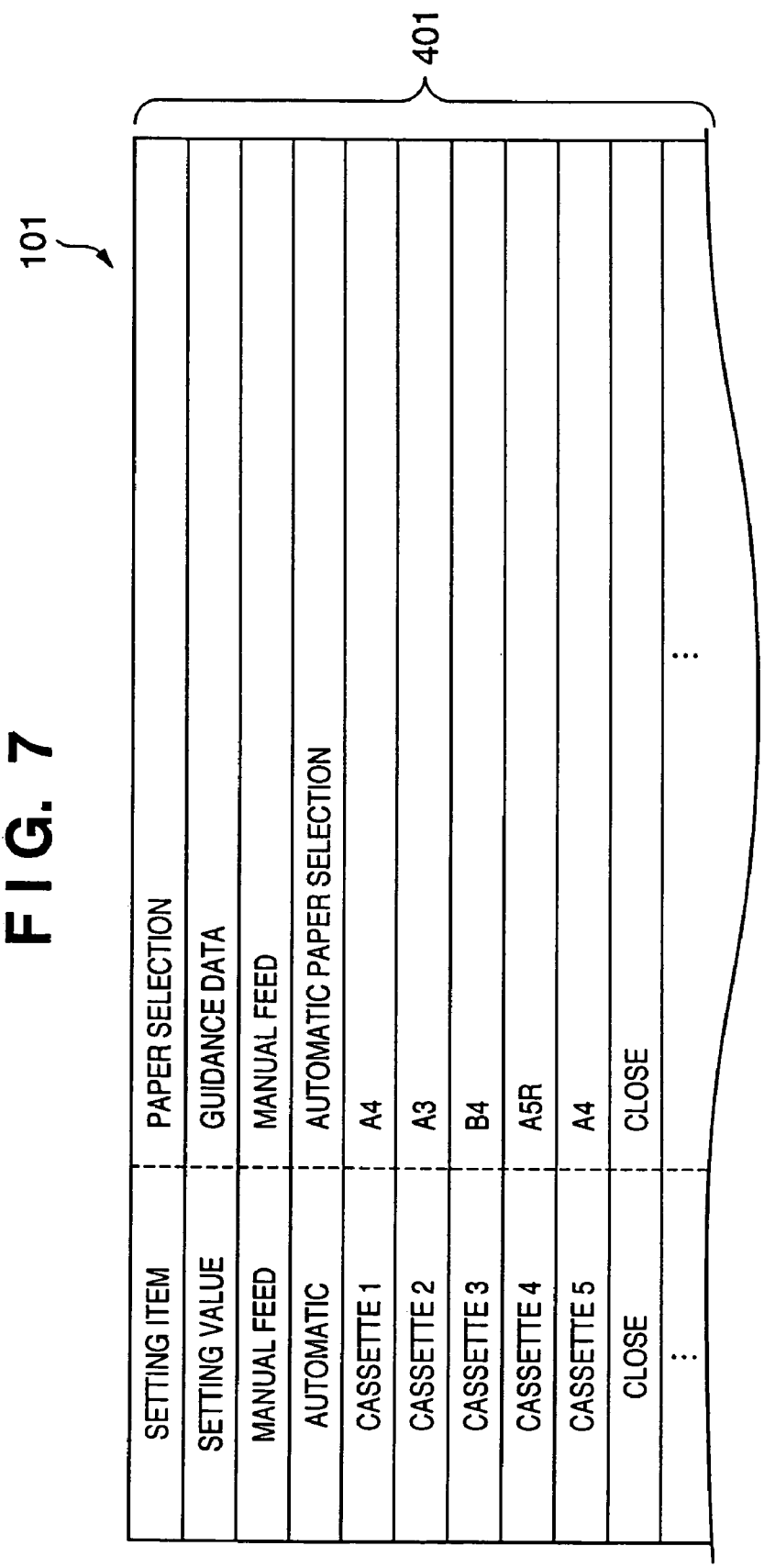
FIG. 7 is a chart showing an example of data on paper selection in a guidance holding unit 101.
Figure 8:
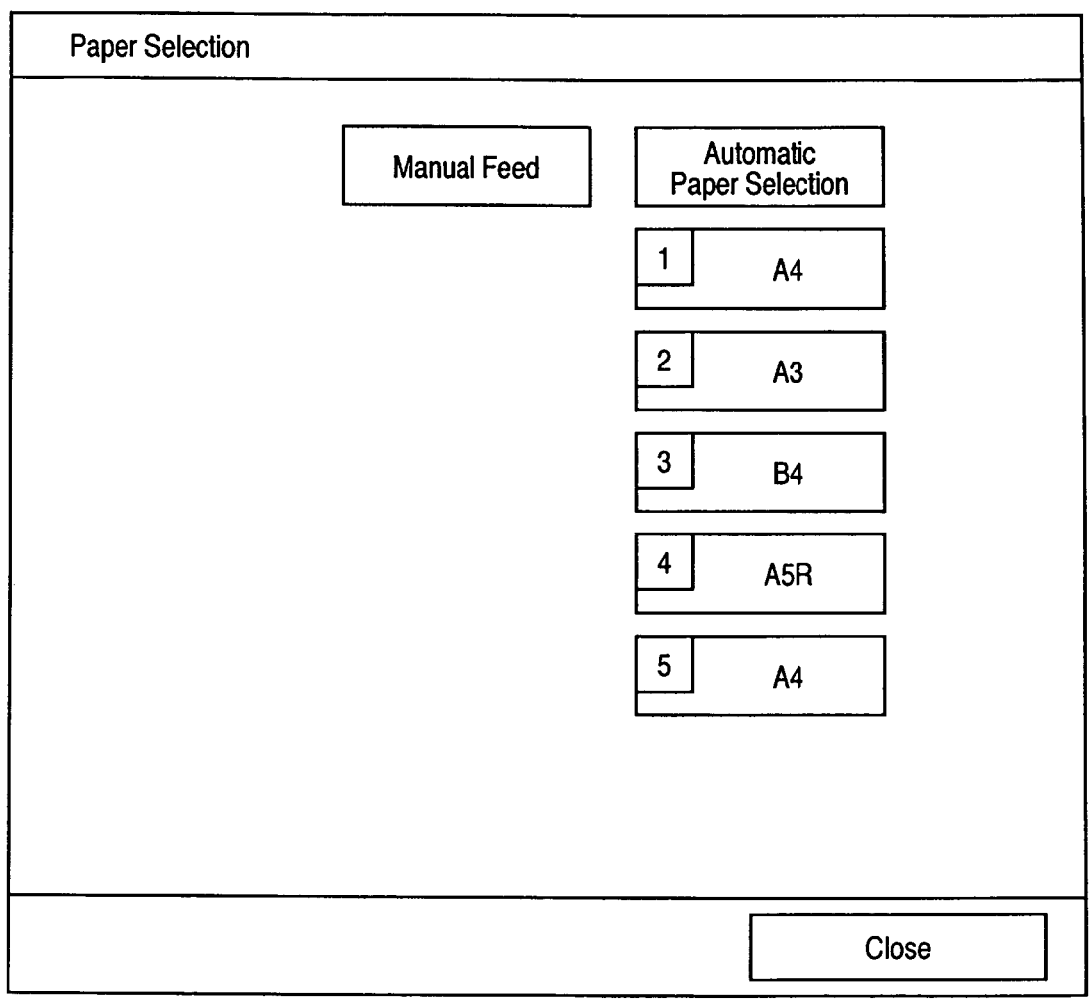
FIG. 8 is a view showing an example of a GUI associated with paper selection.

FIG. 7 is a chart showing a part of a guidance registration portion 701 corresponding to a setting item of "paper selection" in a guidance holding unit 101. The guidance shown in FIG. 7 correspond to a GUI screen shown in, e.g., FIG. 8. In step S203, the guidance in the guidance registration portion 701 is retrieved. In step S602, the guidance selection unit 104 selects one to be voice-synthesized from the guidances retrieved in step S203 on the basis of the device information acquired in step S601.

As an example, a case will be explained where "Cassette 2: out of paper" and "Cassette 3: out of paper" are acquired as the device information in step S601. Assume that in this embodiment, a guidance corresponding to a setting value (cassette) for a paper-out condition is not selected. Of the guidances for the setting item of "paper selection," guidances selected if the device information is a combination of "Cassette 2: out of paper" and "Cassette 3: out of paper" are six guidances, "manual feed," "automatic paper selection," "A4," "A5R," "A4," and "close" in FIG. 7.

In step S603, a guidance in the active status is changed on the basis of the device information. In the setting item for paper selection, no guidance is changed (abridged) for being output by voice. However, in the case of copy ratio setting or the like, a guidance is changed on the basis of the size of paper sheets on which output can be produced. For example, as described above, if Cassette 2 and Cassette 3 are out of paper, there are no A3 and B4 paper sheets. For example, because B4 paper sheets cannot be used for producing output in copy ratio setting, the guidance of "122%, A4 or letter to B4; or A5 to B5" is changed to "122%, A5 to B5." Also, for example, if a result of detecting paper cassettes shows in copy ratio setting that there are no A5-size paper sheets, the guidance of "81%, B4 to A4 or letter; or B5 to A5" is changed to "81%, B4 to A4 or letter."

As described above, according to the second embodiment, a guidance corresponding to a settable setting value is selected according to the device information and becomes an object to be voice-synthesized and output. For this reason, generation of unnecessary voice guidance can be eliminated, and the operability is improved.

Note that, of course, a configuration obtained by combining selection or change of a guidance based on document information in the first embodiment and selection of a guidance based on device information in the second embodiment may be used.

As has been explained above, in the embodiments, a guidance corresponding to a settable setting value is selected as an object to be output by voice, when outputting, by voice, a guidance corresponding to a setting value. The selection is performed according to information such as document information or device information which limits a setting range (range of selection) for a setting value. The guidance corresponding to the setting value is analyzed, and the contents thereof are streamlined (part of the guidance corresponding to an unsettable portion is eliminated) according to the limiting information. A combination of "a reduction in the number of guidances output by voice" and "shortening of contents of guidance output by voice" as described above produces the effect of shortening the time to output these guidances by voice while keeping them appropriate.

Third Embodiment

The first and second embodiments have explained the process of voice-synthesizing and outputting a guidance on a setting item to be set. A third embodiment will explain a configuration which makes a notification of an already set setting value by a guidance voice.

Figure 9:
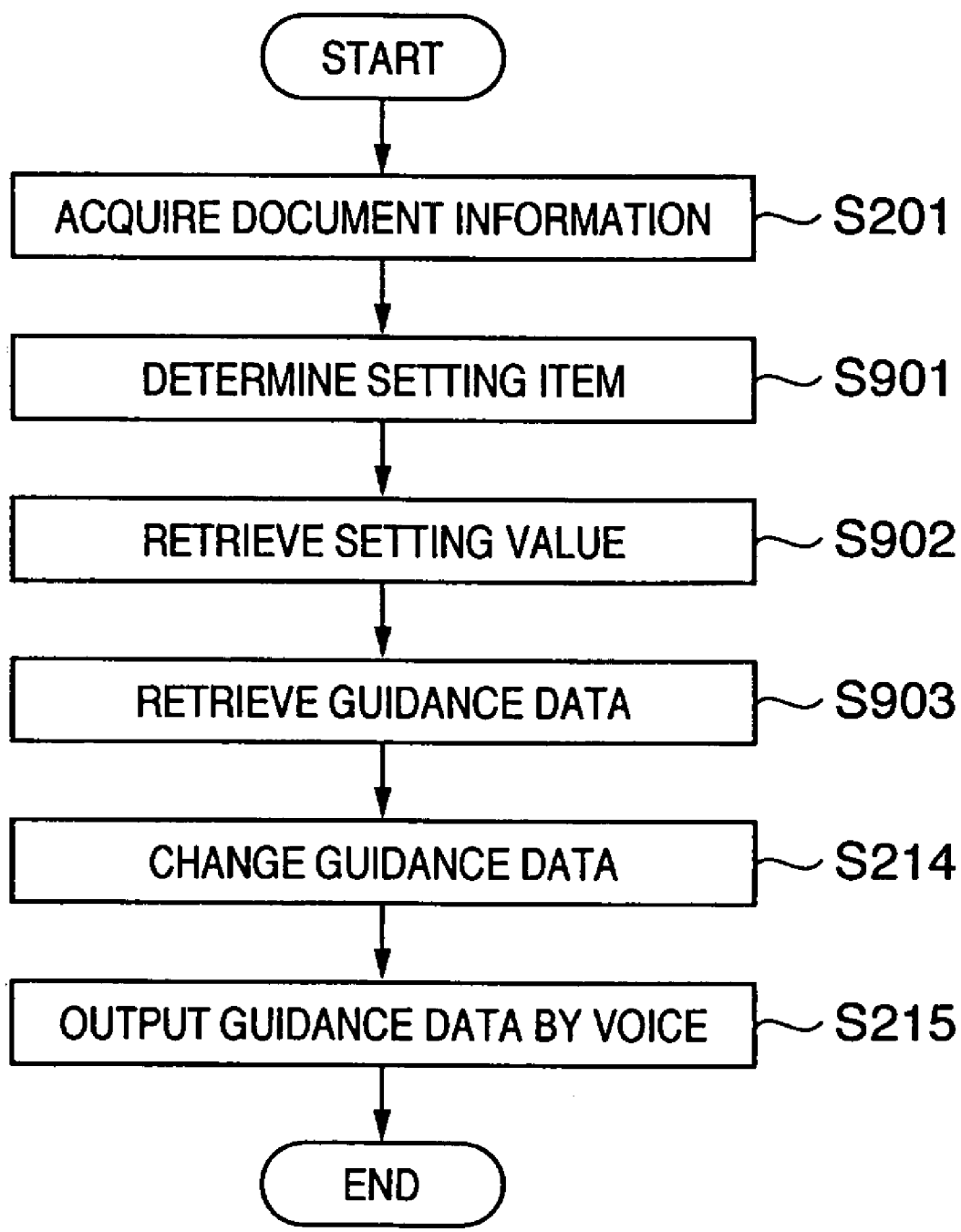
FIG. 9 is a flowchart for explaining the processing procedure according to a third embodiment.

FIG. 9 is a flowchart for explaining the procedure for processing by an image forming apparatus according to the third embodiment. In FIG. 9, the processes in steps S201, S214, and S215 are the same as those of the first embodiment (FIG. 2).

In step S901, a setting item whose setting value is to be read aloud is determined. Assume that in this example, "copy ratio" is determined as the current setting item. In step S902, a setting value set for the setting item determined in step S901 is retrieved from a setting value holding unit 109. Assume that the setting value is set at "122%." In step S903, a guidance corresponding to the setting value retrieved in step S902 is retrieved from a guidance holding unit 101. In this example, the guidance of "122%, A4 or letter to B4; or A5 to B5" corresponding to the setting value of "122%" corresponding to the setting item of "copy ratio" is retrieved (FIG. 4). In step S214, the guidance is changed on the basis of document information. In step S215, the changed guidance is voice-synthesized and output. For example, if "paper size: A4" is acquired as the document information, "122%, A4 to B4" is output by voice as the guidance.

According to the third embodiment, as for a setting item whose current setting value is already set, an appropriate guidance can be output by voice. Note that although in the above example, document information is used, device information as explained in the second embodiment or a combination of document information and device information can be used instead.

Fourth Embodiment

Each of the first to third embodiments has explained a method of extracting a part of a guidance as a method of changing the guidance on the basis of document information and/or device information in step S214. The present invention, however, is not limited to this. For example, a guidance may be changed, as will be described later.

In the first and second embodiments, the guidance holding unit 101 holds one guidance for each of setting values. In a fourth embodiment, a guidance holding unit 101 holds a plurality of guidances for each of setting values. More specifically, a plurality of guidances are held for each setting value, and each of the plurality of guidances is held together with document information and device information for selecting the guidance. One guidance specified according to a setting value and document information and/or device information is selected.

FIG. 10 shows an example about a setting value of "86%" for a setting item of "copy ratio." In this case, if document information is "paper size: A4," the guidance of "A4 to B5" is selected. If the document information is "paper size: A3," the guidance of "A3 to B4" is selected. Although not shown in FIG. 10, the guidance of "A4 or letter to B5" is registered in association with device information of "B4 cassette: out of paper." If device information indicating that a B4 cassette is out of paper is obtained, that guidance is acquired. With this guidance holding unit 101, an appropriate guidance can be acquired without analyzing and changing the guidance as described above in step S214.

Fifth Embodiment

As for the process of selecting a guidance on the basis of document information and/or device information in step S204, each of the first to third embodiments has explained a method of using information contained in a guidance itself (e.g., a size contained in the guidance with respect to a size in the document information). However, selection of a guidance based on document information and/or device information is not limited to this. For example, a guidance may be selected, as will be described later.

A guidance holding unit 101 holds, for each of setting values, a condition (document information or device information) for selecting a guidance corresponding to the setting value. If document information or device information meeting the condition is acquired, the guidance selection unit 104 selects the guidance corresponding to that condition. FIG. 11 is a chart showing an example of the configuration of data in the guidance holding unit 101 according to a fifth embodiment. FIG. 11 shows examples of a combination of a setting value for a setting item of "copy ratio" and a piece of document information on "paper size." In this case, the guidance of "61%, A3 to B5" is selected when the copy ratio is 61%, and the document information is "paper size: A3."

With the configuration of the fifth embodiment, a guidance can be selected according to document information and/or device information without analyzing the guidance. More specifically, according to the fourth and fifth embodiments, a guidance for each setting value is classified using part of document information or device information which can be acquired by a document information acquisition unit 102 or a device information acquisition unit 121. Accordingly, it is possible to quickly acquire a guidance corresponding to document information or device information without analyzing the contents of the guidance.

Other Embodiment

In the first embodiment, the changed guidance is output by voice using voice synthesis in step S215. However, voice data corresponding to each guidance may be held to be played back.

In the second embodiment, in step S602, since a guidance for Cassette 1 and one for Cassette 5 are both "A4," guidances of "A4" are redundantly selected. At this time, only one of the guidances may be selected. More specifically, if a guidance whose contents are the same as those of a guidance to be selected is already selected as a guidance to be output by voice, the guidance to be selected may be determined not to be selected.

In the above embodiments, document information or device information is acquired at the start of processing. Alternatively, the document information or device information may be acquired and held in advance and used at the time of the processing. For example, when a voice UI is started, a document placed on a document table is read, and document information is acquired and stored. If the document information becomes necessary later, the held document information is used.

Figure 16:
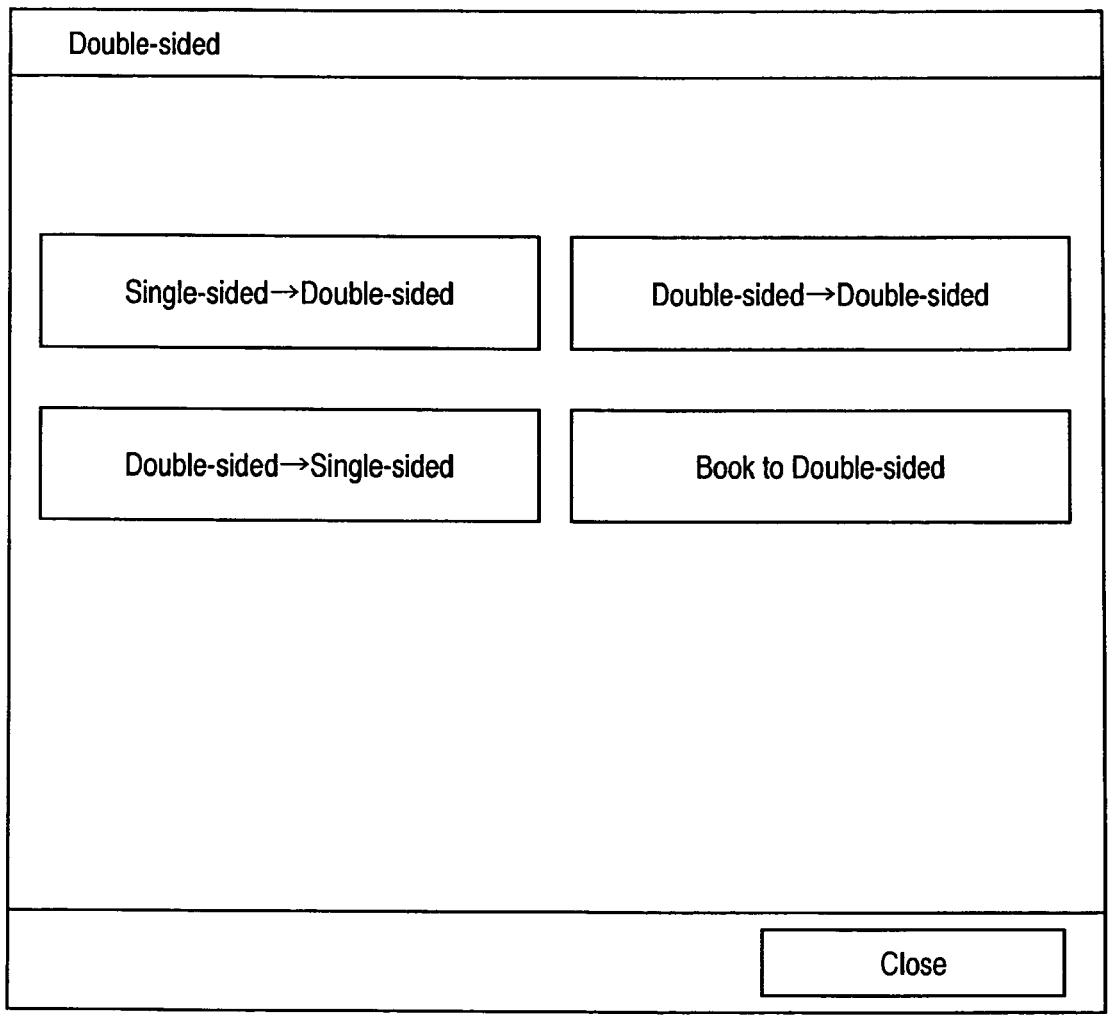
FIG. 16 is a view showing an example of a GUI associated with double-sided setting.

In the embodiments, the guidance on copy ratio is streamlined according to paper size. The present invention, of course, is not limited to this. For example, a guidance associated with a double-sided printing function may be streamlined depending on whether a document is "double-sided" or "single-sided.". In this case, as for a setting item of "double-sided," a guidance corresponding to a combination of a setting value for the setting item of "double-sided" and document information on "double-sided/single-sided" is registered, as shown in, e.g., FIG. 15. Note that guidances in FIG. 15 correspond to a GUI screen for double-sided setting shown in, e.g., FIG. 16.

If the setting item of "double-sided" is selected in step S202 of FIG. 2, and document information is "double-sided," guidances of "double-sided to single-sided," "double-sided to double-sided," and "close" are retrieved in step S203. If the setting item of "double-sided" is selected, and the document information is "single-sided" in step S202 of FIG. 2, guidances of "single-sided to double-sided," "book to double-sided," and "close" are retrieved in step S203. The processes in S205 and subsequent steps are performed using those guidances retrieved in step S203.

Needless to say, the object of the present invention is also achieved by supplying a storage medium having recorded thereon a software program code which implements the functions of the above-described embodiments to a system or apparatus and reading out and executing the program code stored in the storage medium by a computer (or a CPU or MPU) of the system or apparatus.

In this case, the program code itself read out from the storage medium implements the functions of the embodiments, and the storage medium storing the program code constitutes the present invention.

As a storage medium for supplying the program code, for example, a flexible disk, hard disk, optical disk, magnetooptical disk, CD-ROM, CD-R, magnetic tape, nonvolatile memory card, ROM, or the like may be used.

The functions of the embodiments are implemented not only by executing the read-out program code by the computer. The present invention, of course, includes a case where an OS (operating system) running on the computer performs part or all of actual processing in accordance with the instructions of the program code, thereby implementing the functions of the embodiments.

The present invention further includes a case where the program code read out from the storage medium is written to memory of a function extension board or function extension unit which is inserted in or connected to the computer, and a CPU or the like of the function extension board or function extension unit performs part or all of actual processing in accordance with the instructions of the program code, thereby implementing the functions of the embodiments.

According to the present invention, the output contents of a voice guidance on setting of a device are streamlined. This makes it possible to shorten voice output time and provide a user interface with good operability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-206130, filed on Jul. 14, 2005, which is hereby incorporated by reference herein in its entirety.

What is claimed is:

1. An information processing apparatus, comprising:
    a designation unit that designates a copy ratio setting value to which one or more information sets correspond, each of the information sets indicating a pair of an input paper size and an output paper size;
    an acquisition unit that acquires information regarding a paper size of an input document by reading a document placed on a document table of a scanner unit;
    a control unit that extracts, from the one or more information sets corresponding to the copy ratio setting value designated by said designation unit, only the information set of the one or more information sets whose input paper size conforms with the paper size acquired by said acquisition unit, if a plurality of information sets corresponding to different pairs of input paper size and output paper size are assigned to the designated copy ratio setting value; and
    an output unit that outputs, by voice, the information set extracted by said control unit.

2. The apparatus according to claim 1, wherein said designation unit designates one copy ratio setting value by changing a selection of the copy ratio setting value from a plurality of copy ratio setting values using a "4" key and a "6" key of a numeric keypad.

3. An information processing method, comprising:
- a designation step for designating a copy ratio setting value to which one or more information sets correspond, each of the information sets indicating a pair of an input paper size and an output paper size;
- an acquisition step for acquiring information regarding a paper size of an input document by reading a document placed on a document table of a scanner unit;
- a control step for extracting, from the one or more information sets corresponding to the copy ratio setting value designated by said designation step, only the information set of the one or more information sets whose input paper size conforms with the paper size acquired by said acquisition step, if a plurality of information sets corresponding to different pairs of input paper size and output paper size are assigned to the designated copy ratio setting value; and
- an output step for outputting, by voice, the information set extracted by said control step.

4. The method according to claim 3, wherein said designation step designates one copy ratio setting value by changing a selection of the copy ratio setting value from a plurality of copy ratio setting values using a "4" key and a "6" key of a numeric keypad.

5. A non-transitory computer-readable storage medium storing a control program that cause a computer to execute a control method, the method comprising:
- a designation step for designating a copy ratio setting value to which one or more information sets correspond, each of the information sets indicating a pair of an input paper size and an output paper size;
- an acquisition step for acquiring information regarding a paper size of an input document by reading a document placed on a document table of a scanner unit;
- a control step for extracting, from the one or more information sets corresponding to the copy ratio setting value designated by said designation step, only the information set of the one or more information sets whose input paper size conforms with the paper size acquired by said acquisition step, if a plurality of information sets corresponding to different pairs of input paper size and output paper size are assigned to the designated copy ratio setting value; and
- an output step for outputting, by voice, the information set extracted by said control step.

6. The storage medium according to claim 5, wherein said designation step designates one copy ratio setting value by changing a selection of the copy ratio setting value from a plurality of copy ratio setting values using a "4" key and a "6" key of a numeric keypad.

* * * * *